March 9, 1965 S. H. DOWNS 3,172,671
SHAFT SEAL FOR A FAN HOUSING
Filed March 12, 1962 2 Sheets-Sheet 1

INVENTOR.
SEWELL H. DOWNS
BY
Woodhams, Blanchard & Flynn
ATTORNEYS

March 9, 1965  S. H. DOWNS  3,172,671
SHAFT SEAL FOR A FAN HOUSING
Filed March 12, 1962  2 Sheets-Sheet 2
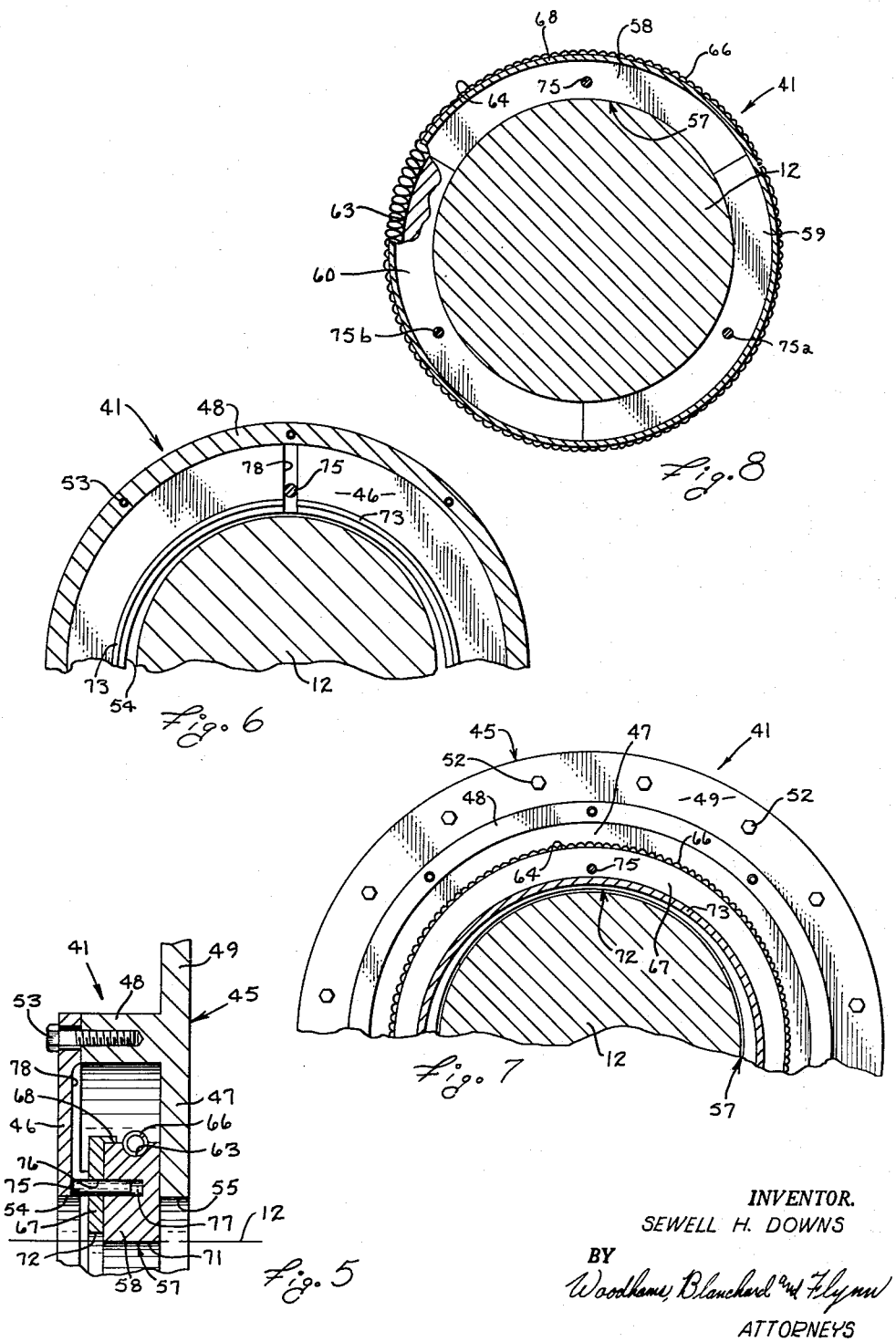
INVENTOR.
SEWELL H. DOWNS
BY
Woodhams, Blanchard and Flynn
ATTORNEYS

United States Patent Office 3,172,671
Patented Mar. 9, 1965

1

3,172,671
SHAFT SEAL FOR A FAN HOUSING
Sewell H. Downs, Kalamazoo, Mich., assignor to Clarage Fan Company, Kalamazoo, Mich., a corporation of Michigan
Filed Mar. 12, 1962, Ser. No. 178,951
7 Claims. (Cl. 277—137)

This invention relates in general to a seal construction and, more particularly, to a shaft seal which can be mounted upon a wall construction through which the shaft extends, and wherein substantial relative movement occurs between the shaft and the wall construction, such movement being radially and/or axially of the shaft.

It will become apparent that the shaft seal of the invention is capable of many useful applications. However, for purposes of illustration, said seal construction will be disclosed herein as a shaft seal particularly adapted for use with a fan construction normally operated under high pressure and high temperature conditions, because it was these circumstances which gave rise to the invention. That is, the form of the invention disclosed herein was designed to prevent the escape of hot, contaminated gases from a fan construction along the fan shaft thereof, particularly where a relatively large pressure differential exists between the interior of the fan construction and the ambient atmosphere. In one such installation, the temperature of the gas varied from less than 70 degrees F. to over 700 degrees F., and the static pressure differential exceeded fifty inches water gauge.

A satisfactory gas seal for the type of application discussed in the foregoing paragraph has been seriously needed for a long time. The successful provision of such a seal has long eluded research and development efforts, particularly in the field of fan construction, for several reasons. In the first place, most of the fan constructions, for which this type of seal construction is particularly needed, are relatively large in size, so that the seal construction must be capable of use on shafts of relatively large diameter. In the second place, the gases moved by the fan construction become very hot, such as in excess of 700 degrees F., so that a substantial amount of relative movement may occur between the fan shaft and the fan housing, both radially and axially of the fan shaft, as the fan construction is heated up to or cooled down from its normal operating temperature.

In the third place, fan constructions which require this type of seal construction are often used where they must handle gases contaminated with noxious or abrasive ingredients which are injurious to conventional seal materials and which will create unhealthful conditions in the vicinity of the fan construction, if they are allowed to escape therefrom.

In the fourth place, fan constructions in which this type of seal is needed frequently require shaft speeds which can cause excessive damage to conventional sealing materials or to the portion of the shaft engaged by the seal, particularly where the gas being handled by the fan contains abrasive particles.

Accordingly, a primary object of this invention has been the provision of an improved seal construction capable of preventing the escape of gas along a shaft extending through a wall construction, particularly where there is substantial relative movement between the shaft and the wall construction in a radial (also axial) direction at certain times during the normal operation of the mechanism associated with the shaft.

A further object of this invention has been the provision of a seal construction, as aforesaid, which is adapted for use as a shaft seal in a fan construction having a relatively large shaft, the seal construction being such that it can be disassembled for inspection and/or repair without removing the fan shaft from its mounting upon and between the bearings which support the shaft in its operating position.

A further object of this invention has been the provision of a seal construction, as aforesaid, which is capable of operating efficiently and effectively against relatively high pressures and in excessively high temperatures as well as at normal room temperatures, which requires little or no maintenance during normal operation, and which is relatively inexpensive to manufacture and install, particularly by comparison with existing seal constructions for the same or similar purposes.

A further object of this invention has been the provision of a seal construction, as aforesaid, which is relatively compact in size, which requires a minimum of movable parts in order to promote long, trouble free wear characteristics and which is capable of operating for long periods of time at relatively high shaft speeds with a minimum of wear, even in the presence of some abrasive particles.

Other objects and purposes of this invention will become apparent to persons familiar with this type of equipment upon reading the following descriptive material and examining the accompanying drawings, in which:

FIGURE 5 is a fragment of FIGURE 3 similar to the fragment shown in FIGURE 4 with the parts thereof in different positions of operation.

FIGURE 6 is a sectional view taken along the line VI—VI in FIGURE 4.

FIGURE 7 is a sectional view taken along the line VII—VII in FIGURE 4.

FIGURE 8 is a sectional view taken along the line VIII—VIII in FIGURE 4.

Figure 1:
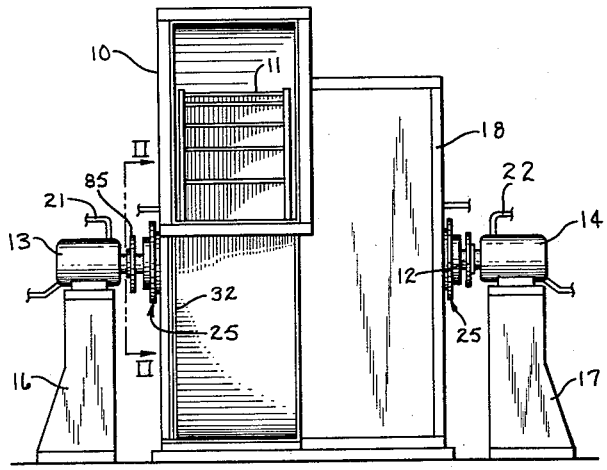
FIGURE 1 is a front view of a fan construction including a seal construction embodying the invention.

For the convenience of description, the terms "upper," "lower," "front," "rear" and words of similar import have reference, as used herein, to the fan construction and parts thereof as they appear in FIGURE 1, which discloses the front side of said fan construction. The terms "interior" and "exterior," as used herein shall apply to the right and left sides, respectively, of the seal construction of the invention as it appears in FIGURES 1 and 3. The terms "inner," "outer" and derivatives thereof will have reference to the center of the seal construction of the invention and parts thereof.

*General description*

The objects and purposes of the invention, including those set forth above, have been met by providing a seal construction comprised of a seal housing which is mounted upon a side wall of a fan construction, for example, and encircles a rotatable shaft where it extends through said side wall. In one form of the invention, a pair of annular sealing units are mounted in spaced, substantially coaxial relationship upon the seal housing so that both units encircle the shaft on the outer side of the fan construction. Each of the sealing units, which are preferably substantially identical in construction, includes an annular seal retainer containing a segmented, annular seal which snugly embraces the portion of the fan shaft extending through the sealing unit. The opening through the annular seal is substantially smaller than the shaft openings through the seal retainer and through the side wall of the fan construction, through which said shaft portion extends. Each seal retainer also includes a seal positioning member which, by engagement with one axial side wall of the seal retainer, urges the seal against the other axial side wall of the seal retainer. A connecting device prevents relative rotation between the annular seal and the seal retainer around the axis of the shaft, while permitting movement of said seal in radial directions with respect to said seal retainer.

Conduit means communicates between a source of pressure fluid, such as compressed air, and the annular zone within the seal housing between the sealing units. Compressed air is forced into the annular zone at a pressure which is preferably at least equal to the pressure developed within the fan construction. Accordingly, the compressed air will oppose the tendency for the gas handled by the fan construction to leak past the interior seal, which is adjacent the fan construction. The escape of pressure fluid through the exterior seal will have no adverse effects and will tend to provide some cooling for the seal construction.

*General construction*

The fan construction in FIGURE 1, which has been selected to illustrate one application for a preferred embodiment of the invention, is comprised of a fan housing 10 in which a fan wheel 11 is rotatably supported upon a shaft 12 which is in turn rotatably supported by and between the bearings 13 and 14 mounted upon the bearing pedestals 16 and 17, respectively. In this particular embodiment, the fan housing 10 is provided with an inlet box 18, through which the shaft 12 also extends. The bearings 13 and 14 may be of the liquid cooled type having conduits 21 and 22, respectively, connected thereto for carrying the coolant in a conventional manner. The foregoing description of a fan construction may be substantially conventional and, therefore, is described for illustrative purposes and to give greater meaning to the structure of the invention detailed hereinafter.

Figure 2:
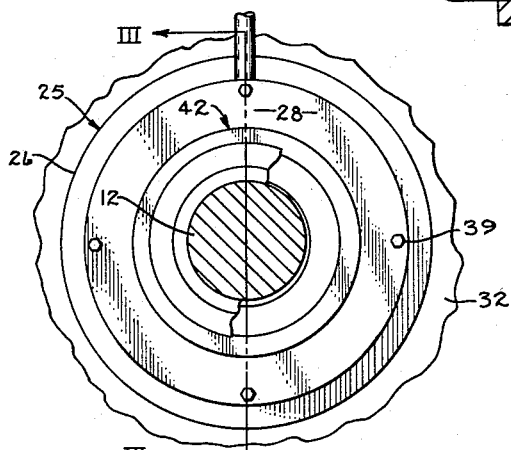
FIGURE 2 is a broken, sectional view taken along the line II—II in FIGURE 1.

The seal assembly 25 (FIGURES 2 and 3) includes a seal housing or support frame 26 having an interior side plate 27, an exterior side plate 28 and a peripheral wall 29, which is secured to and extends between the spaced side plates 27 and 28 which are substantially parallel. The peripheral wall 29 is preferably spaced inwardly from the outer edges of the side plates 27 and 28 for assembly reasons, as appearing hereinafter. The interior side plate 27 (FIGURE 3) is secured to the side sheet 32 of the housing 10 (FIGURE 1) by means such as the nuts and bolts 33 so that the circular shaft opening 34 in the side plate 27 is aligned with the opening 36 in the side sheet 32. The shaft openings 34 and 36 are both substantially larger than the diameter of the portion of the shaft 12 which extends through the two openings, so that said shaft can move radially with respect to the housings 10 and 26 without engaging the side sheet 32 or side plate 27. In one particular fan construction, the openings 34 and 36 had to be large enough to permit relative radial movement of about 0.75 of an inch between the shaft 12 and the adjacent portions of the housings 10 and 26. This movement resulted from the expansion of the housing 10 when the temperature thereof was raised from about 70 degrees F. to about 700 degrees F., which was the normal operating temperature for the particular installation.

The exterior side plate 28 has a central shaft opening 37 which is substantially coaxial with the opening 34 in the interior side plate 27 and is substantially larger than the portion of the shaft 12 extending therethrough, in order to permit radial movement of the shaft 12 with respect to the exterior side plate 28, as discussed above with respect to the interior side plate 27. A radially extending flange 38 is rigidly secured to the wall 29 adjacent the exterior side plate 28 and is connected to said side plate by nuts and bolts 39 disposed outwardly of the peripheral wall 29. This arrangement permits removal of the exterior side plate 28 for the purpose of inspecting the interior of the housing 26.

Figure 4:
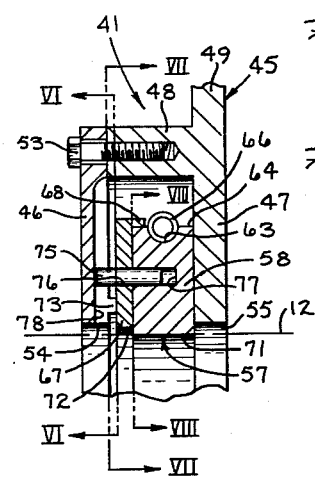
FIGURE 4 is an enlarged fragment of one of the two sealing units disclosed in FIGURE 3.

An interior sealing unit 41 (FIGURES 3 and 4) is supported within the housing 26 upon and adjacent the inner surface of the interior side plate 27. An exterior sealing unit 42 (FIGURE 3) is mounted upon the outer side of the exterior side plate 28. Since the interior sealing unit 41 and exterior sealing unit 42 are preferably substantially identical in this particular embodiment of the invention, a detailed description of the interior sealing unit 41, only, will be given herein and such will be understood to apply, at least in substance, to the construction of the exterior sealing unit 42. Accordingly, parts of the exterior sealing unit 42 discussed herein will be identified by the same numerals, with the addition of the suffix "a," which are applied to the corresponding parts of the sealing unit 41.

The interior sealing unit 41 (FIGURES 3 and 4) is comprised of an annular seal retainer 45 having a pair of spaced, substantially parallel and annular side walls 46 and 47 and a peripheral wall 48. In this particular embodiment, the peripheral wall 48 is integral with the interior side wall 47 and is spaced radially inwardly of the radially outer edge of said side wall 47 in order to provide a mounting flange 49 for securing the sealing unit 41 upon the interior side plate 27 by means such as the nuts and bolts 52. The exterior side wall 46 of the seal retainer 45 is removably secured to the adjacent edge of the peripheral wall 48 by means of the screws 53. The side walls 46 and 47 have central, preferably coaxial openings 54 and 55, respectively, which are usually circular and are substantially larger than the portion of the shaft 12 extending through said openings.

An annular seal 57 (FIGURES 4 and 5) is disposed substantially within the retainer 45. In this particular embodiment, the seal 57 is in the shape of a ring which is comprised of a plurality of arcuate segments, such as the three segments 58, 59 and 60, which are preferably substantially identical in size and are arranged so that they extend completely around and snugly embrace the shaft 12. Said sealing ring is preferably fabricated from solid graphite or some other durable, and self-lubricating material capable of providing an effective and lasting seal even where the temperature is varied over a wide range and where the shaft rotates at a high speed. The sealing ring 57, hence each segment thereof, has an annular groove 63 (FIGURES 4 and 8) in its peripheral surface 64 into which a resiliently flexible element, such as the spiral spring 66, is disposed under tension. The spiral spring 66 is preferably made from steel or the like so that it will retain its strength, shape and resilience even though it is subjected to high temperatures and/or large changes in temperature. The spring 66 releasably holds the segments 58, 59 and 60 in a continuous ring and snugly against the shaft 12.

An annular positioning member 67 (FIGURES 4 and 7), which is preferably a substantially flat, metallic ring capable of resisting relatively high temperatures, is disposed adjacent the exterior surface of the sealing ring 57 and has an annular flange 68 which projects axially from said ring adjacent the periphery thereof. The inside diameter of the flange 68 is substantially identical to the outside diameter of the sealing ring 57 so that said flange can be sleeved upon the adjacent portion of the peripheral surface 64 of said sealing ring 57. Thus, the flange 68 limits the radial movement of the arcuate segments 58, 59 and 60 away from the shaft 12. The diameter of the inner cylindrical surface 71 of the sealing ring 57 is substantially identical with the outside diameter of the portion of the shaft 12 extending therethrough, in order to effect maximum sealing ability. The circular opening 72 through the positioning member 67 is somewhat larger than the inside diameter of said sealing ring so that said member 67 is clearly spaced from the adjacent portion of the shaft 12.

The exterior side wall 46 (FIGURES 4 and 6) has an annular, integral ridge 73 on its inner surface, which ridge is preferably substantially coaxial with the opening 54 therethrough and near thereto. The ridge 73 is shaped so that it snugly engages the adjacent surface of the positioning member 67 completely around the shaft 12. Moreover, the axial extent of the annular ridge 73 is such that the positioning member 67 and the sealing ring 57 are snugly held between and against the ridge 73 and the side wall 47. Thus, the sealing ring 57 not only resists the escape of gas between the sealing ring and the shaft 12 but also between the sealing ring and the side wall 47. Further sealing is achieved by the engagement between the ridge 73 and the adjacent side of the positioning member 67.

A positioning pin 75 (FIGURE 4) extends through a pin opening 76 in the positioning member 67 and into a pin recess 77 in the adjacent side of the arcuate segment 58 for holding the positioning member 67 and the segment 58, hence the sealing ring 57, against relative rotation with respect to each other. One end of the pin 75 is slidably disposed within a radially extending groove 78 in the inner side of the exterior side wall 46. Accordingly, the positioning pin 75 also prevents rotation of the positioning member 67 and the sealing ring 57 around the shaft 12 with respect to the retainer 45. However, the radial elongation of the pin groove 78 permits radial movement of the positioning member 67 and the sealing ring 57 with the shaft 12 and with respect to the retainer 45.

The arcuate elements 59 and 60 (FIGURE 8) are held with respect to the retaining ring 67 by pins 75a and 75b, respectively, in substantially the same manner as set forth above with respect to the pin 75 and element 58.

However, pin 75 is the only one of these pins which engages the side wall 46 for the purpose of preventing relative rotation between said side wall and the sealing ring 57.

Figure 3:
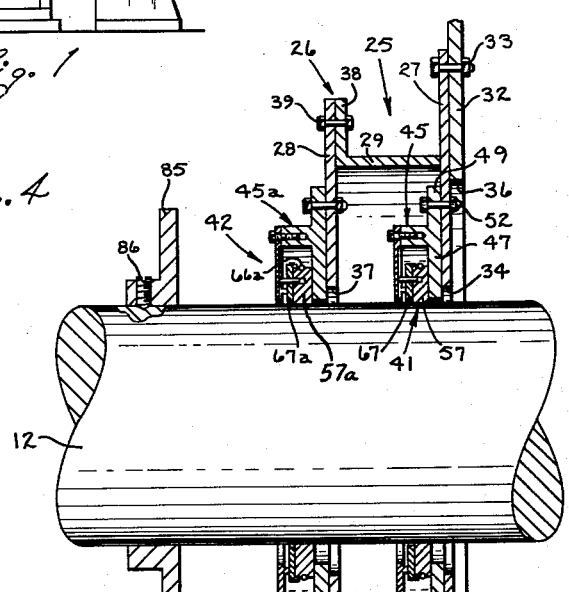
FIGURE 3 is a sectional view taken along the line III—III in FIGURE 2.

As stated previously, the sealing unit 42 is preferably but not necessarily substantially identical to the sealing unit 41. More specifically, said sealing unit 42 includes a seal retainer 45a having side walls 46a and 47a, and a peripheral wall 48a which is integral with the interior side wall 47a and is located thereon to provide the flange 49a whereby the retainer 45a is mounted upon the outer surface of the exterior side plate 28 of the seal housing 26 (FIGURE 3).

The sealing unit 42 (FIGURE 3) includes a sealing ring 57a, a spiral spring 66a and a positioning member 67a which are disposed within the retainer 45a and encircle the shaft 12 in substantially the same manner as set forth above with respect to the corresponding parts within the retainer 45.

The side plate 28 is preferably welded to the flange 38 and the side plate 27 is preferably welded to the side sheet 32, after the sealing unit 41 is assembled, to minimize the escape of gas through the seal assembly 25. The seal housing 26 may, if desired, be fabricated with a split construction so that said housing can be completely removed to expose the sealing units 41 and 42. In such case, the housing 26 is split along a plane, which preferably includes the axis of the shaft 12, so the parts of the housing on the opposite sides of the plane can be pulled radially away from the shaft 12. Split housing constructions of this type are common knowledge in this art.

A pressure fluid conduit 81 (FIGURE 3) is mounted upon the peripheral wall 29 of the seal housing 26 so that it communicates through an opening 82 therein with the interior of said seal housing 26 between the sealing unit 41 and the exterior side plate 28, hence the healing unit 42. The conduit 81 is connected to any convenient source, indicated diagrammatically at 83 in FIGURE 3, of pressure fluid, such as compressed air. By directing pressure fluid through the conduit 81 into the seal housing 26 at a pressure approximately equal to, or slightly greater than, the pressure within the fan housing 10, the seepage of gas from within the fan housing along the shaft 12 or through any other part of the sealing unit 41 is effectively prevented.

An annular heat shield 85 is sleeved upon the shaft 12 and held thereon by the set screw 86 adjacent to, but spaced from, the sealing unit 42 for the purpose of directing away from the bearings 13 or 14 (FIGURE 1) any gas under pressure, including said compressed air, which escape through the sealing unit 42, particularly where gas is hot. That is, the pressure existing within the fan housing and/or the counteracting pressure developed by the source 83 can cause some leakage of gas through the sealing unit 42. The heat shield 85 deflects this gas away from the adjacent bearing.

*Operation*

In mounting a seal assembly 25 (FIGURE 1) upon a fan housing 10 or inlet box 18, care must be exercised to position the seal housing 26 and the seal retainers 45 and 45a (FIGURE 3) so that they are close to but spaced from the upper surface of the shaft 12 (for a floor supported unit) when the entire construction is at room temperature. Accordingly, as the temperature is increased up to operating conditions, the fan housing and/or inlet box 18 will expand and thereby move the seal housing, hence the sealing units 41 and 42, upwardly therewith. The sealing rings 57, 57a and the positioning member 67, 67a will remain concentric with the shaft 12, upon which they are supported, as the seal retainers 45 and 45a move upwardly with the remainder of the seal assembly 25 and the side sheet 32 of the fan housing 10. As stated above, the central openings in the side plates 27 and 28, and in the side walls 46, 46a, 47 and 47a are substantially larger than the diameter of the shaft 12. Thus, the seal assembly 25 can move upwardly with respect to the shaft 12 and the sealing rings 57 and 57a without causing the upwardly moving parts of the seal assembly to interfere with the rotational freedom of the shaft 12. Moreover, the engagement of the sealing rings 57 and 57a with the shaft 12 is such that the shaft 12 can move in a lengthwise direction with respect to the seal assembly 25 without affecting adversely the sealing ability of the seal assembly 25.

When pressure fluid is being fed into the seal housing 26 through the conduit 81 at a pressure substantially equal to or greater than the pressure in the fan housing 10, some of such pressure fluid will, as a rule, escape past the sealing ring 57a, as along the shaft 12. At the same time, some of such pressure fluid may also escape past the sealing ring 57 into the fan housing. However, the amount of pressure fluid thus moving past the sealing rings 57 and 57a will not adversely affect the operation of the fan and it will tend to cool the seal assembly 25.

Under some circumstances, particularly where the pressures and/or temperatures within the fan housing are not excessive, or where the gas handled by the fan construction does not contain noxious ingredients or particles, the conduit 81 and the source of pressure fluid 83 connected thereto may be omitted. In such case, the amount of gas which will seep through both of the sealing units 41 and 42 will be negligible and can be ignored.

It will also be apparent that, for light duty purposes, a single sealing unit, such as the sealing unit 41, may be mounted upon the side sheet 32 of the fan housing 10 by means, such as an interior side plate 27, only. In such case, the peripheral wall 29, the external side plate 28 and the sealing unit 42 would be omitted as unnecessary.

For the purposes of convenience and illustration, the foregoing disclosure has been in terms of a fan construction having a rotating fan shaft of circular cross section. Accordingly, the seal construction disclosed above has been designed for use where there is axial, radial and rotational movement of the shaft. However, the seal of the invention is also and obviously applicable to other installations wherein an element extends through an opening in a wall for movement with respect to the wall, and wherein a pressure differential exists between the two zones which communicate with said opening on opposite sides of the wall. Thus, where the element moves axially and radially, but is non-rotatable, with respect to the wall, the element could have a non-circular cross section, and the annular seal 57 would have an opening of a corresponding size and shape. Moreover, where the radial movement is primarily along one diameter, the openings 34, 37, 54 and 55, for example, could be elongated along said diameter, as opposed to circular, and accomplish the same results.

Although a particular preferred embodiment of the invention has been disclosed in detail above for illustrative purposes, it will be understood that variations or modifications of such disclosure, which come within the scope of the appended claims, are fully contemplated.

What is claimed is:

1. A sealing unit for an opening in a wall member through which a shaft member loosely extends, comprising:
   a seal retainer having a pair of spaced, substantially parallel side walls and peripheral wall means secured to and extending between said side walls, said side walls having axially aligned openings through which a portion of the shaft member is slidably receivable for radial movement with respect to said retainer, and one of said side walls having a peripheral edge capable of circumscribing the opening in the wall member;
   an annular seal of rigid material defining an opening of approximately the same size and shape as said portion of said shaft member, said annular seal being disposed within said retainer and snugly against the inner surface of said one side wall completely around the opening therein;
   an annular member disposed within said retainer between the other side wall thereof and said annular seal, said annular member defining an opening slightly larger than the opening in said annular seal, and rigid means on said other side wall snugly engaging said annular member and holding same against said annular seal, whereby said annular seal is snugly held between said annular member and the one side wall;
   means associated with said annular member for holding same with respect to said annular seal so that the openings defined thereby are substantially coaxial; and
   means connecting said annular seal and said annular member to said retainer for preventing relative rotation therebetween, said seal and said annular member being radially movable with respect to said retainer.

2. A sealing unit according to claim 1 wherein said annular seal is comprised of plural segments and said means associated with said annular member holds said segments substantially in an annular arrangement.

3. A sealing unit according to claim 1 wherein said annular seal is comprised of plural segments and said means associated with said annular member is an annular flange on said annular member encircling the adjacent portion of said annular seal; and
   wherein said means connecting said annular seal and said annular member to said retainer includes radially disposed grooves in the surface of said other sidewall adjacent said annular member and pin means engaged by said annular seal and extending through said annular member into said groove means.

4. A sealing unit according to claim 1 wherein said annular seal is comprised of plural segments and said means associated with said annular member comprises an annular flange on said annular member and encircling the adjacent portion of said annular seal; and
   including a resiliently flexible element encircling said annular seal and urging the segments thereof toward the shaft.

5. A sealing unit according to claim 1 wherein said rigid means on said other sidewall is an annulus integral with and extending from the surface of said other sidewall adjacent said annular member, said annulus being substantially concentric with the opening in said other sidewall.

6. A shaft seal for a fan construction having a side sheet with an opening therein through which the fan shaft extends for substantial radial movement with respect to said side sheet, comprising:
   a seal retainer having a pair of spaced, substantially parallel side walls and peripheral wall means secured to and extending between said side walls, one of said side walls being securable to the side sheet of the fan construction and having a peripheral edge capable of circumscribing the opening in said side sheet, said side walls having axially aligned, substantially circular openings therein of substantially greater diameter than the diameter of the portion of the shaft extending through the side sheet;
   a plurality of rigid, arcuate segments arranged to form an annular seal disposed within said retainer against said one side wall, said annular seal having an inside diameter approximately equal to the diameter of said portion of the shaft and materially smaller than the diameter of the opening in said side sheet;
   an annular member disposed within said retainer between said annular seal and the other side wall, said annular member having flange means for engaging said arcuate segments and holding same in said annular arrangement, the outside diameters of said seal and said annular member being substantially smaller than the inside diameter of said peripheral wall;
   rigid annular means projecting from said other side wall and snugly engaging said annular member substantially completely around said shaft and holding said annular member against said one side wall, whereby said annular seal is held by said annular member in sealing engagement with said one side wall; and
   holding means connecting said annular member to one of said segments and to the other side wall for preventing relative rotation therebetween around the axis of said shaft, said holding means including means supporting said annular member and said segments for radial movement within and with respect to said retainer, whereby said shaft can move a material distance radially of said side sheet without disturbing the seal.

7. A shaft seal according to claim 6, in which said holding means includes means defining a radially extending groove in said other side wall, means defining aligned openings in said annular member and said annular seal, and a positioning pin extending through said openings and into said groove and being disposed in said groove for movement in a radial direction therealong.

References Cited by the Examiner

UNITED STATES PATENTS

| | | | |
|---|---|---|---|
| 1,580,603 | 4/26 | Jabs | 277—142 X |
| 2,867,458 | 1/59 | Kroekel | 277—137 |
| 2,908,516 | 10/59 | Stein | 277—142 X |

LEWIS J. LENNY, *Primary Examiner.*

SAMUEL ROTHBERG, EDWARD V. BENHAM,
*Examiners.*